US012684431B2

(12) United States Patent  
Koskela et al.

(10) Patent No.: US 12,684,431 B2  
(45) Date of Patent: **\*Jul. 14, 2026**

(54) METHOD, COMPUTER PROGRAM AND APPARATUS FOR SELECTING A BEAM FOR HANDOVER

(71) Applicant: Nokia Technologies OY, Espoo (FI)

(72) Inventors: Timo Koskela, Oulu (FI); Samuli Heikki Turtinen, Ii (FI); Benoist Pierre Sebire, Tokyo (JP); Juho Mikko Oskari Pirskanen, Kangasala (FI)

(73) Assignee: NOKIA TECHNOLOGIES OY, Espoo (FI)

( \* ) Notice: Subject to any disclaimer, the term of this patent is extended or adjusted under 35 U.S.C. 154(b) by 0 days.

This patent is subject to a terminal disclaimer.

(21) Appl. No.: 18/830,430

(22) Filed: Sep. 10, 2024

(65) Prior Publication Data

US 2024/0430760 A1 Dec. 26, 2024

Related U.S. Application Data

(63) Continuation of application No. 17/325,848, filed on May 20, 2021, now Pat. No. 12,133,126, which is a  
(Continued)

(51) Int. Cl.  
*H04W 36/00* (2009.01)  
*H04W 36/30* (2009.01)  
*H04W 36/24* (2009.01)

(52) U.S. Cl.  
CPC ..... *H04W 36/0077* (2013.01); *H04W 36/302* (2023.05); *H04W 36/0072* (2013.01); *H04W 36/249* (2023.05)

(58) Field of Classification Search  
CPC ........... H04W 36/0077; H04W 36/302; H04W 36/0072; H04W 36/249  
See application file for complete search history.

(56) References Cited

U.S. PATENT DOCUMENTS

| | | | |
|---|---|---|---|
| 6,879,830 B1 | 4/2005 | Vollmer et al. | |
| 8,131,295 B2 | 3/2012 | Wang et al. | |

(Continued)

FOREIGN PATENT DOCUMENTS

| | | |
|---|---|---|
| CN | 103828257 A | 5/2014 |
| EP | 1018849 B1 | 3/2007 |

(Continued)

OTHER PUBLICATIONS

Extended European Search Report for European Application No. 24221571.3 dated Apr. 14, 2025, 16 pages.

(Continued)

*Primary Examiner* — Shah M Rahman  
(74) *Attorney, Agent, or Firm* — ALSTON & BIRD LLP

(57) ABSTRACT

A method is provided where handover information about one or more target beams of a target cell is provided. The beam quality of those target beams is determined along with beam quality of one or more other beams of the target cell. Dedicated uplink resources associated with the target beams and shared uplink resources are associated with the other beams. It is determined based on the beam quality which of the target and other beams is to be used to initiate a connection to the target cell.

15 Claims, 5 Drawing Sheets

Related U.S. Application Data continuation of application No. 16/475,027, filed as application No. PCT/EP2017/000009 on Jan. 5, 2017, now Pat. No. 11,026,137.

(56) References Cited

U.S. PATENT DOCUMENTS

| | | | |
|---|---|---|---|
| 8,331,326 B2 | 12/2012 | Wang et al. | |
| 8,731,555 B2 | 5/2014 | Yokoyama | |
| 8,942,207 B2 | 1/2015 | Son et al. | |
| 9,144,082 B2 | 9/2015 | Rubin et al. | |
| 9,426,712 B2 | 8/2016 | Hagerman et al. | |
| 9,521,605 B2 | 12/2016 | Oh et al. | |
| 9,648,536 B2 | 5/2017 | Kang et al. | |
| 10,028,180 B2 | 7/2018 | Fan et al. | |
| 10,057,025 B2 | 8/2018 | Park et al. | |
| 10,097,316 B2 | 10/2018 | Damnjanovic et al. | |
| 10,136,329 B2 | 11/2018 | Mochizuki et al. | |
| 10,367,677 B2 | 7/2019 | Parkvall et al. | |
| 10,630,410 B2 | 4/2020 | Parkvall et al. | |
| 2002/0090942 A1 | 7/2002 | Karabinis et al. | |
| 2009/0180440 A1 | 7/2009 | Sengupta et al. | |
| 2010/0268951 A1* | 10/2010 | Ryu | H04W 12/06 |
| | | | 713/168 |
| 2013/0083774 A1 | 4/2013 | Son et al. | |
| 2013/0343345 A1 | 12/2013 | Dinan | |
| 2014/0073329 A1 | 3/2014 | Kang et al. | |
| 2015/0181485 A1 | 6/2015 | Son et al. | |
| 2015/0222345 A1 | 8/2015 | Chapman et al. | |
| 2015/0382268 A1 | 12/2015 | Hampel et al. | |
| 2016/0007261 A1 | 1/2016 | Oh et al. | |
| 2016/0157267 A1* | 6/2016 | Frenne | H04B 7/086 |
| | | | 370/329 |
| 2016/0183233 A1* | 6/2016 | Park | H04W 36/0072 |
| | | | 370/329 |
| 2016/0183234 A1 | 6/2016 | Sung et al. | |
| 2016/0219571 A1* | 7/2016 | Lin | H04W 52/04 |
| 2016/0381611 A1 | 12/2016 | Uchino et al. | |
| 2017/0006539 A1 | 1/2017 | Kakishima et al. | |
| 2017/0026962 A1* | 1/2017 | Liu | H04W 72/0446 |
| 2017/0033854 A1 | 2/2017 | Yoo | |
| 2017/0195998 A1 | 7/2017 | Zhang et al. | |
| 2017/0207843 A1 | 7/2017 | Jung et al. | |
| 2017/0215117 A1 | 7/2017 | Kwon et al. | |
| 2017/0230869 A1* | 8/2017 | Kubota | H04B 7/0639 |
| 2017/0302414 A1 | 10/2017 | Islam et al. | |
| 2017/0311217 A1* | 10/2017 | Jung | H04W 48/08 |
| 2017/0366992 A1 | 12/2017 | Rune et al. | |
| 2018/0103407 A1 | 4/2018 | Nagaraja et al. | |
| 2018/0138962 A1 | 5/2018 | Islam et al. | |
| 2018/0152869 A1 | 5/2018 | Cedergren et al. | |
| 2018/0191416 A1 | 7/2018 | Palenius et al. | |
| 2018/0219594 A1 | 8/2018 | Zhang et al. | |
| 2018/0324653 A1 | 11/2018 | Nagaraja et al. | |
| 2019/0090185 A1 | 3/2019 | Rune et al. | |
| 2019/0104549 A1 | 4/2019 | Deng et al. | |
| 2019/0110234 A1* | 4/2019 | Peisa | H04W 36/085 |
| 2019/0124565 A1 | 4/2019 | Suzuki et al. | |
| 2019/0261230 A1 | 8/2019 | Reial et al. | |
| 2019/0327629 A1 | 10/2019 | Zhang et al. | |
| 2019/0364605 A1 | 11/2019 | Loehr et al. | |
| 2019/0387441 A1 | 12/2019 | Koskela et al. | |
| 2019/0394762 A1 | 12/2019 | Tang | |
| 2020/0053621 A1 | 2/2020 | Reial et al. | |
| 2020/0068616 A1 | 2/2020 | Qian et al. | |
| 2020/0092769 A1* | 3/2020 | Yang | H04W 36/0077 |
| 2020/0196357 A1 | 6/2020 | Park et al. | |
| 2020/0280359 A1* | 9/2020 | Jung | H04W 74/006 |

FOREIGN PATENT DOCUMENTS

| | | | |
|---|---|---|---|
| EP | 3082362 A1 | 10/2016 | |
| EP | 3131328 A1 | 2/2017 | |
| EP | 33200498 A1 | 8/2017 | |
| JP | 2014-531852 A | 11/2014 | |
| JP | 2015-185955 A | 10/2015 | |
| WO | 2013/048212 A1 | 4/2013 | |
| WO | 2015/150020 A1 | 10/2015 | |
| WO | 2015/150021 A1 | 10/2015 | |
| WO | 2015/156575 A1 | 10/2015 | |
| WO | WO 2015/147717 A1 | 10/2015 | |
| WO | WO 2016/003624 A1 | 1/2016 | |
| WO | 2016/044994 A1 | 3/2016 | |
| WO | 2016/127403 A1 | 8/2016 | |
| WO | 2016/163786 A1 | 10/2016 | |
| WO | 2016/163845 A1 | 10/2016 | |
| WO | 2016/198123 A1 | 12/2016 | |
| WO | WO 2016/031779 A1 | 6/2017 | |
| WO | WO 2017/123079 A1 | 7/2017 | |
| WO | 2018/083649 A1 | 5/2018 | |
| WO | WO 2019/028733 A1 | 2/2019 | |
| WO | WO 2019/064229 A1 | 4/2019 | |

OTHER PUBLICATIONS

"3rd Generation Partnership Project; Technical Specification Group Radio Access Network; NR; Medium Access Control (MAC) protocol specification (Release 15)", 3GPP TS 38.321 v15.12.0, (Mar. 2021), 79 pages.

"3rd Generation Partnership Project; Technical Specification Group Radio Access Network; NR; NR and NG-RAN Overall Description; Stage 2 (Release 15)", 3GPP 38.300 v15.12.0, (Mar. 2021), 102 pages.

3GPP TS 36.300 V14.0.0, 3rd Generation Partnership Project; Technical Specification Group Radio Access Network; Evolved Universal Terrestrial Radio Access (E-UTRA) and Evolved Universal Terrestrial Radio Access Network (E-UTTRAN); Overall Description; Stage 2 (Release 14) (Sep. 2016) 314 pages.

3GPP TSG RAN WG1 #87; R1-1612460; Agenda Item: 7.1.2.3; Samsung; "RACH Resource for MSG1 Transmission"; Reno, NV, USA, Nov. 14-18, 2016; 4 pages.

3GPP TSG-RAN WG1 #86; R1-166228; Mitsubishi Electric; "Beam Control Operation for Common Channels/Signals in NR"; Agenda Item: 8.1.6 Aspects related to initial access and mobility; Gothenburg, Sweden, Aug. 22-26, 2016; 10 pages.

CMCC, "Gradual UE-Specific (GUS) Initial Access and Multi-Beam Mobility Management", 3GPP TSG RAN WG1 Meeting #86, R1-167114, (Aug. 10-24, 2016), 6 pages.

Corrected Notice of Allowability for U.S. Appl. No. 16/475,027 dated Feb. 12, 2021, 4 pages.

Ericsson, "Inter-cell Handover in NR", 3GPP TSG-RAN WG2 Meeting #96, R2-168730, (Nov. 14-18, 2016), 7 pages.

Examination Report for Indian Application No. 201947030724 dated Jul. 1, 2021, 6 pages.

Extended European Search Report for European Application No. 24153359.5 dated May 8, 2024, 11 pages.

Final Office Action for U.S. Appl. No. 17/325,848 dated Mar. 20, 2024.

Hearing Notice for Indian Application No. 201947030724 dated Nov. 10, 2023, 2 pages.

Huawei et al., "Discussion on beam management aspects for UL MIMO", 3GPP TSG RAN WG1 Meeting #87, R1-1611671, (Nov. 14-18, 2016), 4 pages.

Huawei, HiSilicon, "RACH Procedures for Unified Single and Multiple Beam Based Access",R1-1611669, 3GPP TSG RAN WG1 Meeting 87, Reno, USA, dated Nov. 14-18, 2016.

Intention to Grant for European Application No. 22181632.5 dated Oct. 17, 2023.

International Search Report and Written Opinion for International Application No. PCT/EP2017/000009, mailed on Sep. 13, 2017; 16 pages.

Iwamura et al., *Further Enhancements of LTE—LTE Release 9,* NTT Docomo Technical Journal, vol. 18 No. 1 (Apr. 2010) p. 51, 3.2.

Mitsubishi Electric, "Beam control operation for common channels/ signals in NR", R1-166228, 3GPP TSG-RAN WG186, Gothenburg, Sweden, dated Aug. 22-26, 2016.

(56)  References Cited

OTHER PUBLICATIONS

Non-Final Office Action for U.S. Appl. No. 17/325,848 dated Sep. 14, 2023.

Notice of Allowance for Taiwanese Application No. 107100077 dated May 26, 2021, 3 pages.

Notice of Allowance for U.S. Appl. No. 16/475,027 dated Jan. 29, 2021.

Notice of Allowance for U.S. Appl. No. 17/325,848 dated Jun. 10, 2024.

Office Action for Chinese Patent Application No. 201780082348.1 dated Dec. 1, 2020, with English translation, 7 pages.

Office Action for European Application No. 17700188.0 dated Sep. 17, 2020, 6 pages.

Office Action for Japanese Application No. 2019-536955 dated Jun. 29, 2020, 9 pages.

Office Action for Taiwan Application No. 107100077 dated Oct. 18, 2020.

Office Action for U.S. Appl. No. 16/475,027 dated Sep. 14, 2020, 8 pages.

Park et al., "Method and Apparatus for UE Signal Transmission in 5G Cellular Communications", Samsung Electronics Inc., USPTO U.S. Appl. No. 62/291,157 Feb. 4, 2016, Total pp. 35 (Year: 2016).

Qualcomm Incorporated, "2 step and 4 step RACH", 3GPP TSG-RAN WG1 #87, R1-1612033, (Nov. 14-18, 2016), 3 pages.

Samsung, "RACH resource for MSG1 transmission", R1-1612460, 3GPP TSG RAN WG1 87, Reno, USA, dated Nov. 14-18, 2016.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 v0.5.0, R2-157181, (Nov. 2015), 86 pages.

Huawei et al., "Measurement and Mobility in high frequency", 3GPP TSG-RAN2 Meeting #96, R2-168255, (Nov. 14-18, 2016), 4 pages.

Huawei et al., "Unified single/multiple beam operations for initial access", 3GPP TSG RAN WG1 Meeting #87, R1-1611667, (Nov. 14-18, 2016), 10 pages.

Intel Corporation, "On NR initial access and mobility", 3GPP TSG RAN WG1 Meeting #86bis, R1-1610402, (Oct. 10-14, 2016), 6 pages.

InterDigital, "Random access aspects for beam-based NR initial access", 3GPP TSG-RAN WG1 #86, R1-167333, (Aug. 22-26, 2016), 3 pages.

LG Electronics et al., "WF on DL measurement for L3 mobility", 3GPP TSG RAN1 #86bis, R1-1610828, (Oct. 10-14, 2016), 3 pages.

LG Electronics Inc., "Potential impact of beam sweeping on RA", 3GPP TSG-RAN WG2 Meeting #95bis, R2-166646, (Oct. 10-14, 2016), 3 pages.

Nokia et al., "Downlink Mobility Measurements in Connected Mode", 3GPP TSG-RAN WG2 Meeting #96, R2-167711, (Nov. 14-18, 2016), 6 pages.

Nokia Networks, "Connected mobility for Rel13 UEs in EC mode", 3GPP TSG-RAN WG2 Meeting #91, R2-153614, (Aug. 24-28, 2015), 3 pages.

NTT Docomo, Inc., "Design for RACH Procedure for NR", 3GPP TSG RAN WG1 Meeting #86, R1-167378, (Aug. 22-26, 2016), 4 pages.

Samsung, "Discussion on Beam Measurement and Tracking for 5G New Radio Interface in mmWave Frequency Bands", 3GPP TSG RAN WG2 #93bis, R2-162226, (Apr. 11-15, 2016), 5 pages.

Samsung, "Evaluation of beam-based RRM Measurement", 3GPP TSG-RAN WG2 Meeting #95bis, R2-167157, (Oct. 10-14, 2016), 6 pages.

Samsung, "Mobility in NR Connected-Active", 3GPP TSG-RAN WG2 Meeting #95bis, R2-166151, (Oct. 10-14, 2016), 4 pages.

Samsung, "NR DL Beam Management Operations", 3GPP TSG-RAN WG2 Meeting #96, R2-168820, (Nov. 14-18, 2016), 7 pages.

Sony, "Considerations on Multiple Beams RACH Procedure", 3GPP TSG RAN WG1 Meeting #87, R1-1612890, (Nov. 14-18, 2016), 4 pages.

Xinwei, "Further Discussion on Beam Management in Random Access Procedures", 3GPP TSG-RAN WG1 #87, R1-1612255, (Nov. 14-18, 2016), 8 pages.

Yun et al., "Comparison of Handover Schemes for 3GPP Long Term Evolution and 3GPP2 Ultra Mobile Broadband", 2008 IEEE 19th International Symposium on Personal, Indoor and Mobile Radio Communications, (Dec. 8, 2008), 5 pages.

ZTE, "Beamformed Random Access in NR", 3GPP TSG RAN WG1 Meeting #86, R1-166419, (Aug. 22-26, 2016), 8 pages.

U.S. Appl. No. 17/325,848, filed May 20, 2021, U.S. Pat. No. 12,133,126, Patented.

U.S. Appl. No. 16/475,027, filed Jun. 28, 2019, U.S. Pat. No. 11,026,137, Patented.

Ericsson, "RRC Measurement Reporting in NR", 3GPP TSG-RAN WG2 Meeting #96, Tdoc R2-168718, (Nov. 14-18, 2016), 4 pages.

Fujitsu, "Discussion on PRACH configuration in NR", 3GPP TSG RAN WG1 Meeting #87, R1-1611461, (Nov. 14-18, 2016), 5 pages.

Nokia Networks, "Connected mobility for Rel13 UEs in EC mode", 3GPP TSG-RAN WG2 Meeting #92, R2-156440, (Nov. 16-20, 2015), 3 pages.

"3rd Generation Partnership Project; Technical Specification Group Radio Access Network; Study on elevation beamforming / Full-Dimension (FD) Multiple Input Multiple Output (MIMO) for LTE (Release 13)", EGPP TR 36.897.v.13.0.0. (Jun. 2015), 58 pages.

"LTE: Evolved Universal Tereestrial Radio Access (E-Utra); Radio Resource Control (RRC); Protocol specification (3GPP TSG 36.331 version 13.2.0. Release 13)", ETSI TS 136 331 V12.2.0, (Aug. 2016), 301 pages.

Bizaki, H., "Towards 4G Wireless Networks; A Physical Layer Perspective", INTECH, (Dec. 14, 2016), 82 pages.

Cox, C., "An Introduction to LTE; LTE, LTE-Advanced, SAE, VoLTE and 4G Mobile Communications", John Wiley & Sonos, Ltd, Second Edition, (2014), 42 pages.

* cited by examiner

METHOD, COMPUTER PROGRAM AND APPARATUS FOR SELECTING A BEAM FOR HANDOVER

CROSS-REFERENCE TO RELATED APPLICATIONS

The present application is a continuation of U.S. Non-Provisional patent application Ser. No. 17/325,848, filed May 20, 2021 and entitled "Method, Computer Program and Apparatus for Selecting a Beam for Handover," which is a continuation of U.S. Non-Provisional patent application Ser. No. 16/475,027, filed Jun. 28, 2019 and entitled "Method, Computer Program and Apparatus for Selecting a Beam for Handover," which is a national stage entry of International Patent Application Serial No. PCT/EP2017/000009, filed Jan. 5, 2017 and entitled "Method, Computer Program and Apparatus for Selecting a Beam for Handover," the entire disclosures of each of which are hereby incorporated herein by reference in their entireties for all purposes as if reproduced herein.

FIELD OF THE INVENTION

Some embodiments relate to a method, system and apparatus in a scenario where beam forming of transmission and/or receiving beams is used and in particular but not exclusively to handover scenarios.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. Another example communication system is so called 5G radio access technology. The 5G radio access technology and LTE-A (Long term evolution-advanced) evolution have proposed using beamforming techniques.

In scenarios where beamforming is used, issues relating to handover may arise, for example due to relatively rapid changes in the radio environment.

SUMMARY

According to one aspect, there is provided a method comprising: receiving at a user device handover information, said handover information comprising information relating to one or more first beams, said one or more first beams being target beams of a target cell; determining beam quality associated with said one or more first beams and one or more second beams of the target cell, said second beams being other than said one or more first beams, dedicated uplink resources being associated with said one or more first beams and shared uplink resources being associated with said one or more second beams; and determining that said user device is to initiate a connection to said target cell using either one or more first beams or one or more second beams of said target cell in dependence on said determined beam quality. The determining that said user device is to initiate a connection to said target cell may comprise determining that one or more second beams is to be used. The determining that said user device is to initiate a connection to said target cell may comprise comparing said determined beam quality to at least one threshold.

The user device may initiate a connection to said target cell using one or more first beams of said target cell only if said determined beam quality of said one or more first beams is above a first threshold of said at least one threshold.

The determining that said user device is to initiate a connection to said target cell may comprise comparing said determined beam quality to a first threshold.

The user device may initiate a connection to said target cell using one or more first beams of said target cell only if said determined beam quality of said one or more first beams is above said first threshold.

The at least one threshold may be one of a fixed value and a variable value.

The user device may initiate a connection to said target cell using one or more second beams only if said determined beam quality of said one or more second beams is above a second threshold of said at least one threshold.

The second threshold may be dependent on said first threshold.

The second threshold may be higher than said first threshold.

The determining that said user device is to initiate a connection to said target cell using one or more beams of said target cell may be dependent on the determined beam quality of said one or more first beams and the determined beam quality of one or more second beams.

If the determined beam quality of the one or more second beams is greater than that of said one or more first beams, said user device may initiate a connection to said target cell using said one or more second beams.

Only if said determined beam quality of said one or more second beams is greater than a first offset as compared to said determined beam quality of said one or more first beams of said target cell may said user device to initiate a connection to said target cell using said one or more second beams.

When it is determined that said user device is to initiate a connection to said target cell and a respective response message is not received from said target cell in a first time period, said method may comprises communicating by said user device with a source cell.

The handover information may comprise information relating to a plurality of first beams, and the method may comprise using priority information for one or more of said first beams to determine which one or more of said first beams is to be used by said user device to initiate a connection to said target cell.

The handover information may comprise information relating to a plurality of first beams, and the method may comprise using time information for one or more of said first beams to determine which one or more of said first beams is to be used by said user device to initiate a connection to said target cell.

The method may comprise initiating a connection to said target cell using said one or more first beams.

The method may comprise initiating a connection to said target cell using said one or more second beams.

The dedicated uplink resources may be contention free random access resources.

The shared uplink resources may be contention based random access resources.

According to another aspect, there is provided an apparatus in a user device comprising at least one processor and at least one memory including computer code for one or more programs, the at least one memory and the computer code configured, with the at least one processor, to cause the apparatus at least to: receive handover information, said handover information comprising information relating to one or more first beams, said one or more first beams being target beams of a target cell; determine beam quality associated with said one or more first beams and one or more second beams of the target cell, said second beams being other than said one or more first beams, dedicated uplink resources being associated with said one or more first beams and shared uplink resources being associated with said one or more second beams; and determine that said user device is to initiate a connection to said target cell using either one or more first beams or one or more second beams of said target cell in dependence on said determined beam quality.

The at least one memory and the computer code may be configured, with the at least one processor, to determine that said user device is to initiate a connection to said target cell using said one or more second beams.

The at least one memory and the computer code may be configured, with the at least one processor, to compare said determined beam quality to at least one threshold.

The at least one memory and the computer code may be configured, with the at least one processor, to cause the user device to initiate a connection to said target cell using one or more first beams of said target cell only if said determined beam quality of said one or more first beams is above a first threshold of said at least one threshold.

The at least one threshold may be one of a fixed value and a variable value.

The at least one memory and the computer code may be configured, with the at least one processor, to cause the user device to initiate a connection to said target cell using one or more second beams only if said determined beam quality of said one or more second beams is above a second threshold.

The second threshold may be dependent on said first threshold.

The second threshold may be higher than said first threshold.

The at least one memory and the computer code may be configured, with the at least one processor, to determine that said user device is to initiate a connection to said target cell dependent on the determined beam quality of said one or more first beams and the determined beam quality of one or more second beams.

The at least one memory and the computer code may be configured, with the at least one processor, if the determined beam quality of the one or more second beams is greater than that of said one or more first beams, to cause said user device to initiate a connection to said target cell using said one or more second beams.

The at least one memory and the computer code may be configured, with the at least one processor, only if said determined beam quality of said one or more second beams is greater than a first offset as compared to said determined beam quality of said one or more first beams of said target cell, to cause said user device to initiate a connection to said target cell using said one or more second beams.

The at least one memory and the computer code may be configured, with the at least one processor, when it is determined that said user device is to initiate a connection to said target cell and a respective response message is not received from said target cell in a first time period, to cause the user device to communicate with a source cell.

The handover information may comprise information relating to a plurality of first beams, and the at least one memory and the computer code may be configured, with the at least one processor, to use priority information for one or more of said first beams to determine which one or more of said first beams is to be used by said user device to initiate a connection to said target cell.

The handover information may comprise information relating to a plurality of first beams, and the at least one memory and the computer code may be configured, with the at least one processor to use time information for one or more of said first beams to determine which one or more of said first beams is to be used by said user device to initiate a connection to said target cell.

The at least one memory and the computer code may be configured, with the at least one processor, to initiate a connection to said target cell using said one or more first beams.

The at least one memory and the computer code may be configured, with the at least one processor, to initiate a connection to said target cell using said one or more second beams.

The dedicated uplink resources may be contention free random access resources.

The shared uplink resources may be contention based random access resources.

According to another aspect, there is provided an apparatus in a user device comprising: means for receiving handover information, said handover information comprising information relating to one or more first beams, said one or more first beams being target beams of a target cell; means for determining beam quality associated with said one or more first beams and one or more second beams of the target cell, said second beams being other than said one or more first beams, dedicated uplink resources being associated with said one or more first beams and shared uplink resources being associated with said one or more second beams; and means for determining that said user device is to initiate a connection to said target cell using either one or more first beams or one or more second beams of said target cell in dependence on said determined beam quality.

The determining means for determining that said user device is to initiate a connection to said target cell may be for determining that one or more second beams is to be used.

The determining means for determining that said user device is to initiate a connection to said target cell may be for comparing said determined beam quality to at least one threshold.

The determining means for determining that said user device is to initiate a connection may be for determining that a connection to said target cell is to be initiated using one or more first beams of said target cell only if said determined beam quality of said one or more first beams is above a first threshold of said at least one threshold.

The at least one threshold may be one of a fixed value and a variable value.

The determining means for determining that said user device is to initiate a connection may be for determining that a connection to said target cell is to be initiated using one or more second beams only if said determined beam quality of said one or more second beams is above a second threshold.

The second threshold may be dependent on said first threshold.

The second threshold may be higher than said first threshold.

The determining means for determining that said user device is to initiate a connection may be for determining that a connection to said target cell is to be initiated dependent on the determined beam quality of said one or more first beams and the determined beam quality of one or more second beams.

The determining means for determining that said user device is to initiate a connection may be for determining that a connection to said target cell is to be initiated using said one or more second beams, if the determined beam quality of the one or more second beams is greater than that of said one or more first beams.

The determining means for determining that said user device is to initiate a connection may be for determining that a connection to said target cell is to be initiated using said one or more second beams, only if said determined beam quality of said one or more second beams is greater than a first offset as compared to said determined beam quality of said one or more first beams.

The apparatus may comprise means for causing said user device to communicate with a source cell when it is determined by said determining means that said user device is to initiate a connection to said target cell and a respective response message is not received from said target cell in a first time period.

The handover information may comprise information relating to a plurality of first beams, and the determining means for determining that said user device is to initiate a connection may use priority information for one or more of said first beams to determine which one or more of said first beams is to be used by said user device to initiate a connection to said target cell.

The handover information may comprise information relating to a plurality of first beams, and the determining means for determining that said user device is to initiate a connection may use time information for one or more of said first beams to determine which one or more of said first beams is to be used by said user device to initiate a connection to said target cell.

The apparatus may comprise means for initiating a connection to said target cell using said one or more first beams.

The apparatus may comprise means for initiating a connection to said target cell using said one or more second beams.

The dedicated uplink resources may be contention free random access resources.

The shared uplink resources may be contention based random access resources.

A computer program comprising program code means adapted to perform the method(s) may also be provided. The computer program may be stored and/or otherwise embodied by means of a carrier medium. The computer program may be provided on a non-transitory computer program carrying medium.

According to another embodiment, a method can be carried out that comprises: receiving, at a user device, handover information, said handover information comprising information relating to one or more first beams, said one or more first beams being target beams of a target cell; determining reference signal received power or reference signal received powers associated with said one or more first beams and reference signal received power or reference signal received powers associated with one or more second beams of the target cell, said one or more second beams being other than said one or more first beams, dedicated uplink resources being associated with said one or more first beams and shared uplink resources being associated with said one or more second beams; and determining that said user device is to initiate a connection to said target cell using one or more second beams of said target cell in dependence on said determined reference signal received power or reference signal received powers of said one or more second beams of said target cell. In some embodiments, said determining that said user device is to initiate a connection to said target cell comprises comparing said determined reference signal received power or reference signal received powers of said one or more first beams to a first threshold. In some embodiments, in an instance in which said determined reference signal received power or reference signal received powers of said one or more first beams is below said first threshold, said determining that said user device is to initiate a connection to said target cell comprises comparing said determined reference signal received power or reference signal received powers of said one or more second beams to a second threshold. In some embodiments, said user device is to initiate a connection to said target cell using one or more second beams in an instance in which said determined reference signal received power or reference signal received powers of the one or more second beams is above said second threshold.

In some embodiments, a handover failure is implemented in an instance in which said determined reference signal received power or reference signal received powers of said one or more second beams is not above said second threshold.

In some embodiments, said determining that said user device is to initiate a connection to said target cell comprises comparing said determined reference signal received power or reference signal received powers of said one or more second beams to at least one threshold. In some embodiments, said user device is to initiate a connection to said target cell using one or more second beams in an instance in which said determined reference signal received power or reference signal received powers of the one or more second beams is above a second threshold of said at least one threshold.

In some embodiments, said at least one threshold is one of a fixed value and a variable value.

In some embodiments, said determining that said user device is to initiate a connection to said target cell comprises comparing said determined reference signal received power or reference signal received powers of said one or more first beams to a first threshold. In some embodiments, said user device is to initiate a connection to said target cell using one or more first beams of said target cell in an instance in which said determined reference signal received power or reference signal received powers of the one or more first beams is above said first threshold.

In some embodiments, said determining that said user device is to initiate a connection to said target cell comprises comparing said determined reference signal received power or reference signal received powers of said one or more first beams to a first threshold. In some embodiments, said user device is to initiate a connection to said target cell using one or more first beams of said target cell in an instance in which said determined reference signal received power or reference signal received powers of the one or more first beams is below said first threshold.

In some embodiments, only in instances in which said determined reference signal received power or reference signal received powers of said one or more second beams is greater than a first offset as compared to said determined reference signal received power or reference signal received powers of said one or more first beams of said target cell is said user device to initiate a connection to said target cell using the one or more second beams.

In some embodiments, in an instance in which it is determined that said user device is to initiate a connection to said target cell and a respective response message is not received from said target cell in a first time period, said method can further comprise: communicating by said user device with a source cell.

In some embodiments, said handover information comprises information relating to a plurality of first beams. In some embodiments, the method can further comprise: using priority information for one or more of said first beams to determine which one or more of said first beams is to be used by said user device to initiate a connection to said target cell.

In some embodiments, the handover information comprises information relating to a plurality of first beams. In some embodiments, the method can further comprise: using time information for one or more of said first beams to determine which one or more of said first beams is to be used by said user device to initiate a connection to said target cell.

In some embodiments, dedicated uplink resources are contention free random access resources and said shared uplink resources are contention based random access resources.

According to another embodiment, an apparatus can be provided, such as an apparatus in a user equipment, or user device. In some embodiments, the apparatus can comprise: at least one processor and at least one memory including computer code for one or more programs. In some embodiments, the at least one memory and the computer code can be configured, with the at least one processor, to cause the apparatus at least to: receive, at a user device, handover information, said handover information comprising information relating to one or more first beams, said one or more first beams being target beams of a target cell; determine reference signal received power or reference signal received powers associated with said one or more first beams and signal received power or reference signal received powers one or more second beams of the target cell, said one or more second beams being other than said one or more first beams, dedicated uplink resources being associated with said one or more first beams and shared uplink resources being associated with said one or more second beams; and determine that said user device is to initiate a connection to said target cell using one or more second beams of said target cell in dependence on said determined reference signal received power or reference signal received powers of said second beams of said target cell.

In some embodiments, said determining that said user device is to initiate a connection to said target cell comprises comparing said determined reference signal received power or reference signal received powers of said one or more first beams to a first threshold. In some embodiments, in an instance in which said determined reference signal received power or reference signal received powers of said one or more first beams is below said first threshold, said determining that said user device is to initiate a connection to said target cell comprises comparing said determined reference signal received power or reference signal received powers of said one or more second beams to a second threshold. In some embodiments, said user device is to initiate a connection to said target cell using one or more second beams in an instance in which said determined reference signal received power or reference signal received powers of the one or more second beams is above said second threshold.

In some embodiments, a handover failure is implemented in an instance in which said determined reference signal received power or reference signal received powers of said one or more second beams is not above said second threshold.

In some embodiments, said determining that said user device is to initiate a connection to said target cell comprises comparing said determined reference signal received power or reference signal received powers of said one or more second beams to at least one threshold. In some embodiments, said user device is to initiate a connection to said target cell using one or more second beams in an instance in which said determined reference signal received power or reference signal received powers of the one or more second beams is above a second threshold of said at least one threshold.

In some embodiments, said at least one threshold is one of a fixed value and a variable value.

In some embodiments, said determining that said user device is to initiate a connection to said target cell comprises comparing said determined reference signal received power or reference signal received powers of said one or more first beams to a first threshold. In some embodiments, said user device is to initiate a connection to said target cell using one or more first beams of said target cell in an instance in which said determined reference signal received power or reference signal received powers of the one or more first beams is above said first threshold.

In some embodiments, said determining that said user device is to initiate a connection to said target cell comprises comparing said determined reference signal received power or reference signal received powers of said one or more first beams to a first threshold. In some embodiments, said user device is to initiate a connection to said target cell using one or more first beams of said target cell in an instance in which said determined reference signal received power or reference signal received powers of the one or more first beams is below said first threshold.

According to another embodiment, a computer program can be provided. In some embodiments, the computer program can comprise computer executable code which, when run on at least one processor, is configured to cause at least the following: receiving at a user device handover information, said handover information comprising information relating to one or more first beams, said one or more first beams being target beams of a target cell; determining reference signal received power or reference signal received powers associated with said one or more first beams and reference signal received power or reference signal received powers associated with one or more second beams of the target cell, said one or more second beams being other than said one or more first beams, dedicated uplink resources being associated with said one or more first beams and shared uplink resources being associated with said one or more second beams; and determining that said user device is to initiate a connection to said target cell using one or more second beams of said target cell in dependence on said determined reference signal received power or reference signal received powers of said one or more second beams of said target cell.

According to another embodiment, an apparatus can be provided, such as an apparatus in a user equipment, or user device. In some embodiments, the apparatus can comprise means, such as at least one processor and at least one memory including computer code for one or more programs. In some embodiments, the apparatus can comprise means for receiving handover information, said handover information comprising information relating to one or more first beams, said one or more first beams being target beams of a target cell; means for determining reference signal received power or reference signal received powers associated with said one or more first beams and signal received power or reference signal received powers one or more second beams of the target cell, said one or more second beams being other than said one or more first beams, dedicated uplink resources being associated with said one or more first beams and shared uplink resources being associated with said one or more second beams; and means for determining that said user device is to initiate a connection to said target cell using one or more second beams of said target cell in dependence on said determined reference signal received power or reference signal received powers of said second beams of said target cell.

In some embodiments, said means for determining that said user device is to initiate a connection to said target cell comprises means for comparing said determined reference signal received power or reference signal received powers of said one or more first beams to a first threshold. In some embodiments, said means for determining that said user device is to initiate a connection to said target cell can comprise means for, in an instance in which said determined reference signal received power or reference signal received powers of said one or more first beams is below said first threshold, comparing said determined reference signal received power or reference signal received powers of said one or more second beams to a second threshold. In some embodiments, said apparatus can comprise means for causing said user device initiate a connection to said target cell using one or more second beams in an instance in which said determined reference signal received power or reference signal received powers of the one or more second beams is above said second threshold.

In some embodiments, said apparatus can comprise means for implementing a handover failure in an instance in which said determined reference signal received power or reference signal received powers of said one or more second beams is not above said second threshold.

In some embodiments, said means for determining that said user device is to initiate a connection to said target cell can comprise means for comparing said determined reference signal received power or reference signal received powers of said one or more second beams to at least one threshold. In some embodiments, said apparatus can comprise means for causing said user device to initiate a connection to said target cell using one or more second beams in an instance in which said determined reference signal received power or reference signal received powers of the one or more second beams is above a second threshold of said at least one threshold.

In some embodiments, said at least one threshold is one of a fixed value and a variable value.

In some embodiments, said means for determining that said user device is to initiate a connection to said target cell can comprise means for comparing said determined reference signal received power or reference signal received powers of said one or more first beams to a first threshold. In some embodiments, said apparatus can comprise means for causing said user device is to initiate a connection to said target cell using one or more first beams of said target cell in an instance in which said determined reference signal received power or reference signal received powers of the one or more first beams is above said first threshold.

In some embodiments, said means for determining that said user device is to initiate a connection to said target cell can comprise means for comparing said determined reference signal received power or reference signal received powers of said one or more first beams to a first threshold. In some embodiments, said apparatus can comprise means for causing said user device to initiate a connection to said target cell using one or more first beams of said target cell in an instance in which said determined reference signal received power or reference signal received powers of the one or more first beams is below said first threshold.

In some embodiments, said apparatus can comprise means for causing the user device to initiate a connection to said target cell using the one or more second beams only in instances in which said determined reference signal received power or reference signal received powers of said one or more second beams is greater than a first offset as compared to said determined reference signal received power or reference signal received powers of said one or more first beams of said target cell.

In some embodiments, said apparatus can comprise means for causing the user device to communicate with a source cell in an instance in which it is determined that said user device is to initiate a connection to said target cell and a respective response message is not received from said target cell in a first time period.

In some embodiments, said handover information comprises information relating to a plurality of first beams. In some embodiments, the apparatus can further comprise means for using priority information for one or more of said first beams to determine which one or more of said first beams is to be used by said user device to initiate a connection to said target cell.

In some embodiments, the handover information comprises information relating to a plurality of first beams. In some embodiments, the apparatus can further comprise means for using time information for one or more of said first beams to determine which one or more of said first beams is to be used by said user device to initiate a connection to said target cell.

In some embodiments, dedicated uplink resources are contention free random access resources and said shared uplink resources are contention based random access resources.

In the above, many different embodiments have been described. It should be appreciated that further embodiments may be provided by the combination of any two or more of the embodiments described above.

Various other aspects and further embodiments are also described in the following detailed description and in the attached claims.

DETAILED DESCRIPTION OF SOME EMBODIMENTS

In the following certain exemplifying embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 5 and 6 to assist in understanding the technology underlying the described examples.

Figure 6:
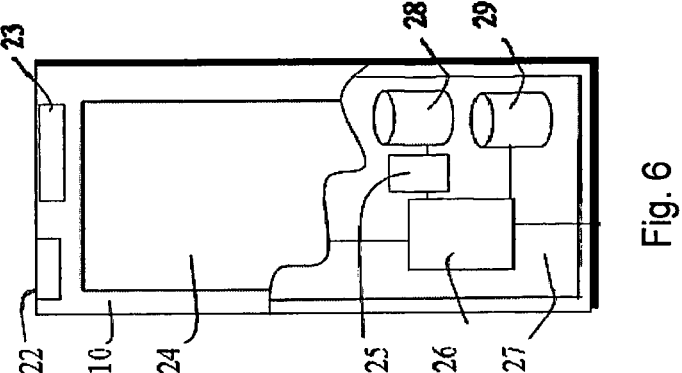
FIG. 6 shows a schematic presentation of a possible communication device.

A communication device 10 or terminal such as shown in FIG. 6 can be provided wireless access via base stations or similar wireless transmitter and/or receiver nodes providing access points of a radio access system.

An access point, for example a base station, may provide at least one antenna beam directed in the direction of the communication device 10 at a given time. In some embodiments a plurality of beams may be directed at a communication device from one or more access points. The antenna beam can be provided by appropriate elements of antenna arrays of the access points. For example, access links between the access points (AP) and a user equipment (UE) can be provided by active antenna arrays. Such arrays can dynamically form and steer narrow transmission/reception beams and thus serve UEs and track their positions. This is known as user equipment-specific beamforming. The active antenna arrays can be used both at the access point and at the user device to further enhance the beamforming potential. More than one beam can be provided by each access point and/or antenna array.

Figure 5:
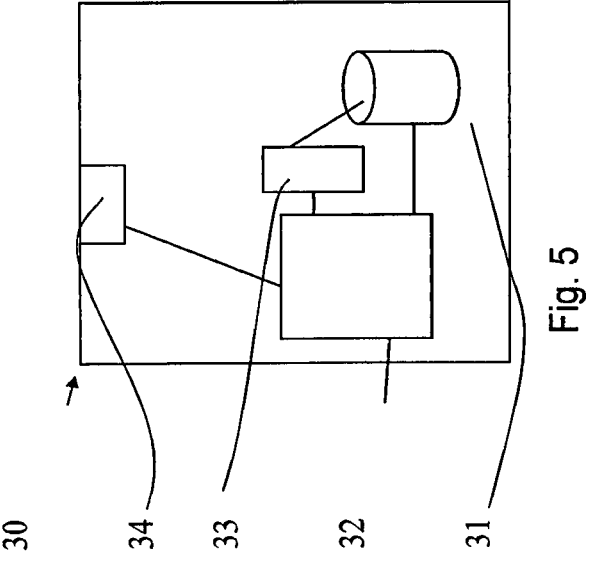
FIG. 5 shows a schematic diagram of a control apparatus according to some embodiments.

Access points and hence communications there through are typically controlled by at least one appropriate controller apparatus so as to enable operation thereof and management of mobile communication devices in communication therewith. FIG. 5 shows an example of a control apparatus for a node, for example to be integrated with, coupled to and/or otherwise for controlling the access points. The control apparatus can be arranged to provide control on communications via antenna beams by the access points and on operations such as handovers between the access points. For this purpose the control apparatus comprises at least one memory 31, at least one data processing unit 32, 33 and an input/output interface 34. Via the interface the control apparatus can be coupled to relevant other components of the access point.

The control apparatus can be configured to execute an appropriate software, code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via fixed line connection and/or radio interface. The logical connection between the base station nodes can be provided for example by an X2 or the like interface. This interface can be used for example for coordination of operation of the stations.

The communication device or user equipment (UE) 10 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

FIG. 6 shows a schematic, partially sectioned view of a possible communication device. More particularly, a hand-held or otherwise mobile communication device (or user equipment UE) 10 is shown. A mobile communication device is provided with wireless communication capabilities and appropriate electronic control apparatus for enabling operation thereof. Thus, the communication device 10 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the communication device are configured to cause control and signalling operations in accordance with certain embodiments as described later in this description. A user may control the operation of the communication device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The communication device may communicate wirelessly via appropriate apparatus for receiving and transmitting signals. FIG. 6 shows schematically a radio block 23 connected to the control apparatus of the device. The radio block can comprise a radio part and associated antenna arrangement. The antenna arrangement may be arranged internally or externally to the communication device.

The antenna arrangement may comprise elements capable of beamforming operations.

Some embodiments relate to mobile communication networks with beamforming techniques. For example, 5G radio access technology and LTE-A (Long term evolution-advanced) evolution have proposed using beamforming techniques.

It should be appreciated that other embodiments may be used with any other communication system which uses beamforming. For example some wireless area networks may use beamforming.

The 5G radio system may use frequencies from 400 MHz to 100 GHz.

Beamforming is considered to be desirable in enabling the use of the higher frequency bands due to coverage issues. It should be appreciated, that other embodiments may use different frequency ranges.

Some transceivers (e.g. a hybrid transceiver architecture) may use analogue beamforming, which may mean a large amount of narrow beams as this is dependent on the number of antenna elements and carrier frequency. It should be appreciated that other embodiments may be used with digital beamforming transceiver architecture or so-called hybrid transceiver architecture which use a hybrid of digital baseband processing (such as MIMO Multiple Input Multiple Output and/or digital precoding) and analogue beamforming. It should be appreciated that embodiments can be used with any method of beamforming.

To compensate the increased path loss when operating on higher frequencies, beamforming has been proposed to provide efficient 5G cell coverage. The aforementioned transceiver architectures provide means for implementing beam forming. As an example, systems deployed to lower frequencies (e.g., sub 6 GHz) may be implemented by using fully digital architecture, and the higher frequencies where the number of antenna elements required for cell coverage may range from tens to hundreds may be implemented by using hybrid-architecture, or even fully analogue architecture.

Relatively large antenna array gains, at both the access point, (e.g., 18 dB with 64 antenna elements) and the user device (e.g., 9 dB with 8 antenna elements) may be achieved to compensate propagation loss and/or losses for example due to rain and oxygen absorption. Different embodiments may of course operate at different carrier frequencies.

Some embodiments may use a carrier frequency of 28 GHz and a system bandwidth of 100 MHz. However, this is by way of example only and different carrier frequencies and/or bandwidths may be used in other embodiments.

Figure 1:
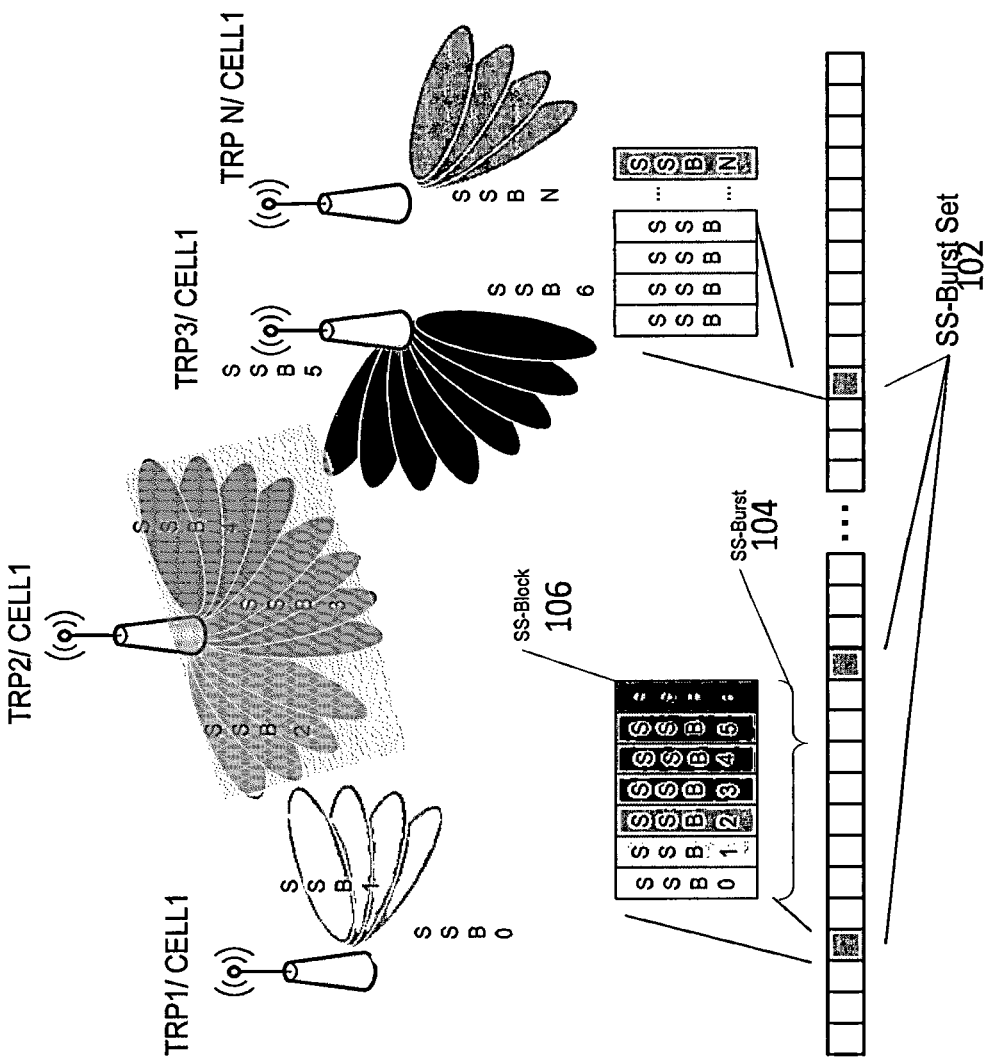
FIG. 1 shows the concept of beam sweeping.
Figure 2:
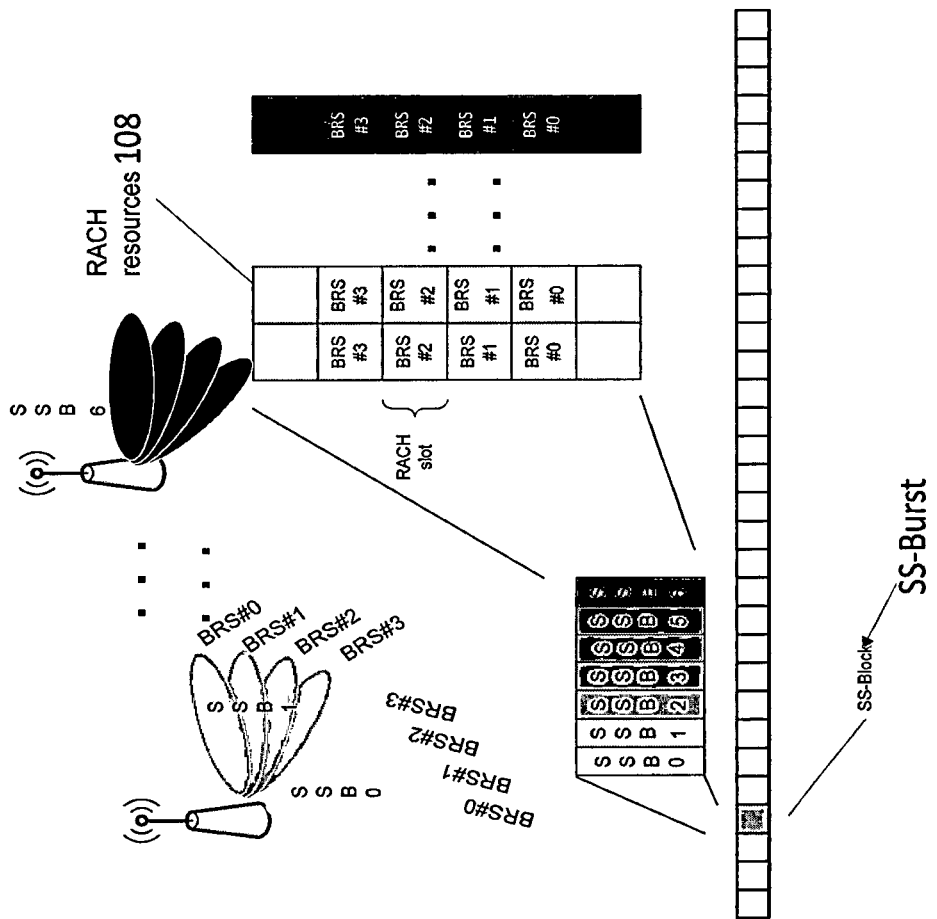
FIG. 2 shows an illustration of beam specific RACH resources.

FIG. 1 shows the concept of beam sweeping. FIG. 1 shows N transmission and reception points TRP for a given cell—CELL A. In particular, TRP1, TRP2, TRP3 and TRPN are shown. N may be any suitable integer. The TRPs are provided by an access point, which may for example be a base station. In order to cover a cell at higher frequencies, multiple beams are required. Each TRP point may cover a particular cell sector. A TRP may be allocated a particular frequency.

In the example shown in FIG. 1, the N TRPs are provided by a single access point/base station. One AP may have one or more TRPs which may or may not be co-located. Each TRP may cover a cell or part of a cell using one or more beams. A sector or any coverage area may be covered by one or more TRPs.

To enable system access, periodical transmission of system information may be required per direction where one or more beams cover a specific area of a cell. The corresponding directions may need to be covered to provide resources for system access. When an access point covers a specific area with a set of beams during a time interval (such as symbol duration, two symbols or N symbols durations where N is an integer) it is called a sweep block or synchronization signal block (SS-block). In single SS-block the system may transmit synchronization signals and beam reference signals to one or multiple directions. A sweeping sub-frame or so-called SS-burst may provide coverage for common control channel signalling with beamforming. The SS-burst may consist of a set/sets of SS-blocks (or sweeping blocks).

In this document, the terms SS block and SS-burst are used. However, the terms sweeping block and sweeping subframes are respective alternative terms for SS-block and SS burst.

The total number of beams required to cover the required cell area may be larger than the number of concurrent active beams that the access point is able to form. Therefore access points need to sweep through the cell coverage area in the time domain by activating a different set of beams on each sweep block. Depending on the number of active beams per SS-block and on the total number of beams required to cover a cell area, two or more SS blocks may be required in single SS-burst. Furthermore, the number of SS-blocks per subframe is limited by the length of each sweep. As an example, one SS-block duration may be one or two symbols (for example, OFDM (orthogonal frequency-division multiplexing) symbols) and if there are 14 symbols per sub-frame, the sweeping sub-frame i.e. SS-Burst would be able to accommodate 7 or 14 SS-blocks. Depending on the number of SS-blocks required to cover a cell, a plurality of SS-bursts may be needed. However, this is by way of example only and different configurations may be used in different embodiments.

In some embodiments the number of active and inactive beams provided may also vary over time. The number of active beams may vary between the access points and/or TRPs.

The active beams may be used for either transmitting or receiving information.

The SS-burst can therefore be defined as a downlink SS-burst, when the active beam is transmitting information, or as an uplink SS-burst, when the active beam is receiving information. Furthermore, assuming a TDD (time division duplex) system and reciprocity between downlink and uplink channels, to cover a cell area on the uplink and the downlink directions with the same beam configurations per SSB, the same SSBs may be defined on uplink and downlink direction.

Thus the cell needs to be swept in the time domain using different subsets of beams. A SS block 106 has a set of active beams, with different beams being active in different SS blocks. A SS burst 104 comprises a set of SS blocks 106. A SS burst 104 may be one subframe or slot. A SS burst set 102 defines the number of SS-bursts (e.g., 106) and periodicity of an SS block 106. For example, both the SS burst 104 and SS block 106 periodicity may be same 5 ms, 10 ms or any other suitable period. Alternatively, the SS burst 104 is transmitted every 5 ms but SS block 106 is transmitted every 20 ms giving system 4 different SS bursts (e.g., 104) to transmit all necessary different SS blocks (e.g., 106) in every 20 ms. The 30 number of bursts and periodicity given are by way of example and any suitable number of bursts and periodicity may be used.

The periodicity of the SS burst 104 is defined depending on the required number of SS blocks 106 needed to cover a cell with a needed SS-block transmission periodicity. The SS-block periodicity is defined to provide frequent enough synchronization signal transmission for synchronization, beam detection and measurement purposes for the UE in given environment. The needed SS-block periodicity is dependent on for example environment, expected mobility of the UE and target mobility performance.

The SS block 106 defines which set of beams (e.g., SSB0 or SSB5) are active. During an SSB, only some of the beams are active, the rest of the beams are inactive.

In FIG. 1, TRP1 is associated with SS blocks SSB0 and SSB1. TRP2 is associated with SS blocks SSB2, SSB3 and SSB4, TRP3 is associated with SS blocks SSB5 and SSB6. TRPN is associated with SS SSBN.

Various control signals, such as synchronization signals (SSs), beam-specific reference signals (RSs), physical broadcast channel (PBCH), PBCH demodulation reference signals (PBCH-DMRS), Channel State Information Reference Signals (CSI-RS), beam specific CSI-RS, Mobility Reference Signals (MRS) etc., may be transmitted by the BS for typically only one set of beams or for one SS block 106 at a time.

In one example the synchronization signals SS may comprise one or more of Primary SS (PSS), Secondary SS (SSS) and additional synchronization signals such TSS/ESS (Tertiary Synchronization Signal, Extended Synchronization Signal). While the PSS and SSS may encode a cell identity (such as PCI, physical cell ID) the additional synchronization signals may encode the SS-block identifier. Alternatively, the ESS may also encode extension of a cell ID in addition to PSS and SSS.

The SS block 106 may include beam specific reference signals enabling the UE to distinguish and measure different beams in a specific SS block 106. In one example the different signals of an SS block 106 may transmitted in different manner: synchronization signals SS/PBCH or other signals may be transmitted using all the beams of an SS block 106 while beam specific signals are transmitted using individual beams. The PBCH transmitted in the SS block 106 may carry one or more parameters such as system frame number (SFN), extended physical cell ID, transmission period of the SS block 106, transmission method and transmission schedule of the system information broadcast, and default configuration ID. The extended physical cell ID may be used with the PSS and SSS to extend the physical cell ID to identify unambiguously the cell in the location of the UE. The UE may use the transmission period of the SS block 106, to determine the possible beams transmitted by the TRP to ensure that it has detected and measured all possible beams. From the default configuration ID the UE may select the correct default configuration that it uses for example in a random access procedure.

In the uplink direction, the SS burst(s) 104 may accommodate resources for the random access channel or other uplink channels requiring periodic availability such as SR (scheduling request).

Each beam within a SS block 106 may have a specific random access channel RACH preamble or set of preambles associated with it. Alternatively a RACH preamble or set of preambles may be beam specific. Each preamble or set of preambles map to a specific BS downlink beam or set of beams. This is schematically shown in FIG. 10. Here, for example, SSBO comprises four separate beams, which in turn have one of an associated RACH resource slot 108. A slot may comprise of one, two or more preambles. SSB1 also has four beams and four associated RACH resource slots 108 and so on for the other SS blocks 106 within the SS burst 104. The RACH preamble space per SS block 106 may be divided between downlink transmission beams. A user device may indicate a preferred beam to connect to by transmitting on the RACH preamble associated with the preferred beam and receiving a random access response RAR message with the same beam alignment. In the case where reciprocity is assumed between DL and UL channels, the preferred or best DL transmit beam may also be assumed to be the best UL reception beam. In case of a non-reciprocity assumption, a RA (random access) procedure may be used to identify also the best UL beam.

Alternatively, a RACH preamble(s) may be common for each SS block 106. The user device may then randomly select a RACH preamble, and the network may determine the strongest beam for the RAR message based on the preamble reception, for example which beam of the current SS block 106 received the strongest preamble signal. The BS may further communicate this to the UE in a response message or any other signalling message associated with the preamble transmission. Each individual UE may have its own index that may be used to refer to a specific BS downlink beam.

A non-limiting definition for a beam is a detection of a beam specific reference signal such as BRS or CSI RS or the like. In one example, a beam specific reference signal BRS is mapped to an antenna port which maps to at least one, typically a plurality of, antenna elements. The signals leading to the antenna elements are individually weighted (depending on architecture this may be analogue or digital weighting), to form a specific radiation pattern.

Multiple antenna ports may be defined (thus multiple radiation patterns may be formed) which are identified by detection of different beam specific reference signals.

These radiation patterns may be equally shaped but may point in different directions.

A single beam specific reference signal may be mapped to two or more antenna ports which may or may not map to the same antenna elements. In some embodiments, antenna elements can be mapped dynamically to different ports. One example is to transmit a beam specific reference signal using two antenna ports where the antenna element specific weights are equal, but the first antenna port maps to elements that are horizontally polarized (H-polarization) and second antenna port maps to elements which are vertically polarized (V-polarization). Thus the radiation patterns of the elements of the first and second ports are the same but as same beam specific reference signal is transmitted through both ports they are observed as a single beam.

In some embodiments, a beam specific reference signal may be transmitted on two or more ports where the antenna element specific weighting is not equal (different radiation patterns).

In a beamformed system where the cell coverage is provided by multiple beams, it may be beneficial to identify a single beam e.g. by using beam specific reference signals enabling user device to perform beam level detection/separation and perform measurements on beam specific reference signal. The measurements may determine indicators such as, but limited to, one or more of Reference Signal Received Power (RSRP), Reference Signal Received Quality (RSRQ), received signal strength indicator (RSSI), channel quality indicator (CQI) or the like. Identifying different beams may be beneficial, e.g., when user device indicates to the network access point the preferred communication beam during initial access or mapping a measurement to a common reference index when reporting the measurements to the network access point.

The transmission of these reference signal may be periodic or aperiodic (i.e., according to a schedule) in each cell. The user device may then measure these signals to determine individual beam qualities within each cell. This allows the user device to determine different beams and refer to a specific beam by the relevant logical beam index. In one example the beam index is a logical index which is unique in a cell. A UE may be able to differentiate beams belonging to different cells based on e.g., physical cell identity. The cell (and beam) specific reference signals may be derived using the cell identity as input or the signals are scrambled with a cell specific identifier or by some other means. These are merely examples.

To identify a beam, the following mappings can be made: e.g., if eight different beam reference signals are transmitted per SSB, the receiver is potentially able to measure eight different signal indices (beams or beam indices). The eight different BRS signals are corresponding to eight antenna ports. The same beam specific reference signal antenna ports may be reused in the next SSB, thus the SSB ID may need to be determined to be able to determine the beam index. Beam index may be derived using the antenna port and SSB index. As an example a beam index may be calculated by:

Beam index=maximum number of BRS/CSI-RS antenna ports*SS-block index+BRS/CSI-RS signal/port id The above described way of calculating a beam index is merely an example and in other embodiments, different ways of determining the beam index for a cell may be used. In another example, a network may configure the UE just to measure and report beam specific signals (e.g., beam specific CSI-RS or the like) which may or may not be cell specific. UE may measure the configured signals (e.g., different antenna ports) and feedback the result to network.

The SS block index may be explicitly signalled if the SS block convey also one or more of information such as MIB, SIB, DL CTRL (downlink control), DL DATA (downlink data) and/or the like. Alternatively or additionally, the SS block may include a specific sequence number to identify the block.

The UE may thus determine different beams and refer to them by a beam index defined by a SS block index and/or a port index and/or by a reference signal port index and/or reference signal. This may depend on network configured reporting format.

The user device may for example determine beam state information (BSI) for each beam, which is used to derive a quality value for a cell. The BSI may be determined by the addition of the beam index with either the reference signal reference power (RSRP) or the reference signal reference quality (RSRQ). The cell quality values may be used to trigger measurement reports which may be used to determine the handover of a user device from one cell to another.

Figure 3:
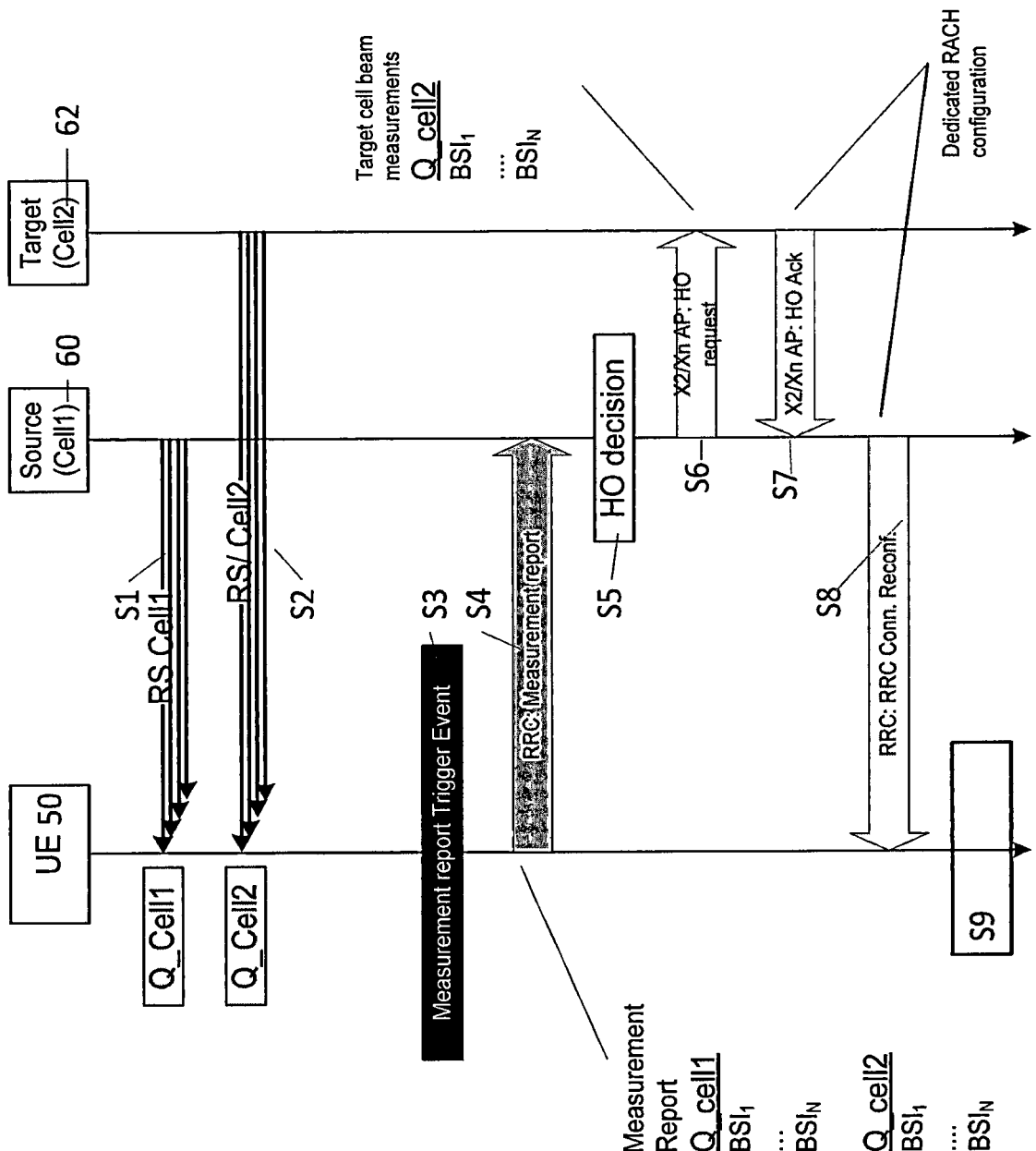
FIG. 3 shows an example of handover signalling with beam reporting.

Reference is made to FIG. 3 shows an example of handover signalling with beam reporting between a user device 50, a source cell 60, and a target cell 62.

In step S1, the user device 50 is receiving reference signals for the source cell 60.

In step S2, the user device 50 is receiving reference signals for the source cell 60.

Steps S1 and S2 may take place in either order or more or less at the same time. By using the individual beam qualities (for example BSI Beam State Information which may be the combination of beam index and quality information such as RSRP/RSRQ) the user device 50 derives a quality value (e.g., Q_cell1). In one example the UE may select a best reference, for example RSRP, measurement to represent the cell quality or it may use an average of N-strongest beam RSRPs. Alternative methods such as using a power sum of N strongest or average of N-strongest beam RSRPs that are within a given offset with reference to a strongest beam may alternatively be used.

In step S3, the user device 50 determines the occurrence of a measurement report trigger event, for example that the quality of the target cell 62 (Q_cell2) is higher than the quality of source cell 60 (Q_cell1) for more than a given amount for a given length of time. In other embodiments, any other suitable trigger event may cause the measurement report.

In step S4, the user device generates a radio resource control (RRC) measurement report, which is sent to the source cell, cell 1. This RRC report may include one or more of: information about cell quality values of the serving cells, information about cell quality values of the neighboring cells; and the N-highest quality BSI for each reported cell or beams above a specific absolute threshold or relative threshold e.g., to a highest quality beam, etc. In some embodiments the BSI information associated with the serving (source) cell may be omitted as the source cell may already have that information via, for example, L1/L2 signalling. The RRC report contents may be defined by the network configuration. In another example the cell quality and beam specific information may be reported in separate messages depending on network configuration.

In step S5, the source cell 60 then determines whether to hand over the user device 50 to the target cell 62 based on the information in the measurement report. The source cell may determine whether to hand over to the target cell in dependence on the cell quality and optionally in dependence on individual beam quality.

If handover is determined to be necessary, then in step S6 the source cell informs the target cell of the handover request in a handover request message. The reported beam information by the user device may be included in the handover request message.

In step S7, the target cell 62 may allocate beam specific contention free RACH resources based on the information reported by the source cell, or alternatively may allocate SS-block specific RACH resources as described previously. This information is provided to the source cell, for example in a handover acknowledgement message.

Alternatively or additionally the contention free resource may be an uplink signalling resource or a data resource. An example of an UL signalling resource may be a SR (scheduling request) which may be assigned from the same resource pool or same SS-block as RACH resources on the uplink. In some cases these resources may be frequency or time (e.g. multiple symbols for corresponding uplink SS-block/sweep block) multiplexed with RACH resources. These resources for the SR may be SS-block specific or beam specific depending on the configuration. Alternatively the SR resources may also be scheduled on uplink control channels such as PUCCH. Another example of UL signalling resource may be an SRS (sounding reference signal). A data resource may be a dedicated resource allocation on uplink for a UE. In one example a dedicated SR resource (or resource other than RACH preamble) could be used when the UE does not need to obtain time alignment with the target cell.

In step S8, the source cell 60 reports to the user device 50, the allocated resources. These resources may be indicated to user device 50 via a RRC (radio resource reconfiguration) message with handover command. Alternatively MAC signalling may be used to initiate the handover to new target cell.

However, in some scenarios, the user device 50 access to the target cell 62, using the contention free RACH configuration provided by the target cell, is not possible due to deterioration of the target cell beams or SS-blocks given in the configuration. Due to the high operating frequency and the use of shaped beams, it may be that beam qualities may change more rapidly than in current cellular systems which operate with single sector beams with a lower operating frequency (for example, below 6 GHz).

With the relative high data rates and relatively low latency requirements of the 5G standard, any delays associated with re-establishing connection need to be avoided.

The handover process performed by the user device 50 in some embodiments is referenced S9 in FIG. 3. The user device 50 has thus received a handover command with dedicated random access resources for particular beam(s)/ SS-block(s) to the target cell. The user device 50 will then determine if that the beam qualities of the beams having the respective dedicated resources is below a configured first threshold_1 (may be an absolute or relative threshold) and considers alternative beams of the target cell with beam quality higher than second threshold_2 with contention based random access resources for handover completion. Alternatively, the user device 50 may evaluate that random access to the beams with dedicated random access resources is not possible, based on determining that the estimated uplink transmission power needed for RACH exceeds the maximum allowed transmission power of the user device 50 or/and cell. The user device 50 may estimate the needed uplink power based on a latest path loss estimate. The user device 50 may estimate based on for, e.g., BRS/CSI-RS and/or on target RSRP value indicated by the radio access network. In dependence on the evaluation, the user device 50 may cancel random access to the beam(s) with UE dedicated resources and then initiate random access to the beam with contention based random access resources. Only if no beams are detected from the target cell 62 will the UE initiates the handover failure procedure.

This leads to connection re-establishment with cell selection.

Figure 4:
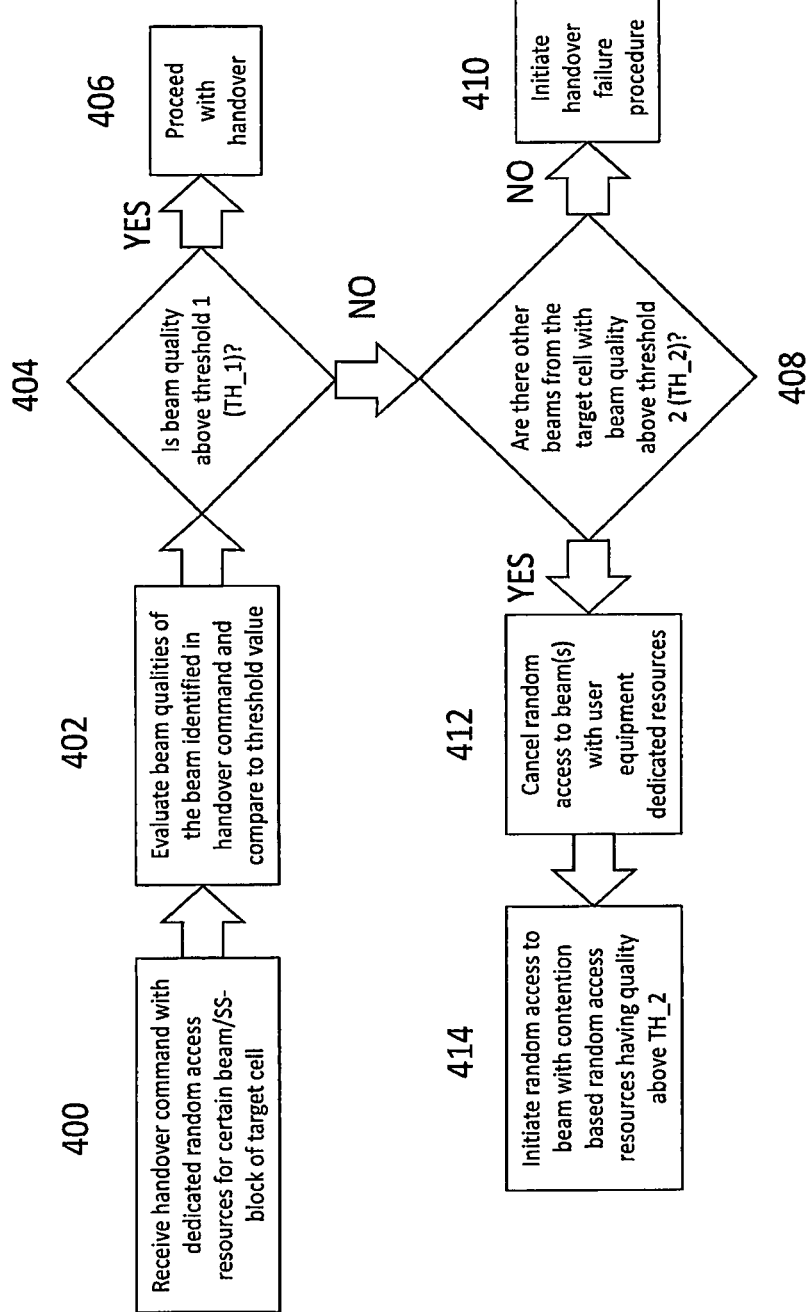
FIG. 4 shows method steps performed in a user device.

This is described in more detail in FIG. 4 which depicts the method steps carried out by the user device 50.

Firstly, at 400, the user device receive the handover command with dedicated random access resources for a certain beam or SS-block of the target cell. For example, the UE will perform beam management during HO when it has reported target cell beam measurements in a RRC measurement report and received a RACH configuration RRC reconfiguration message to establish a connection to Target cell. At 402 the user device evaluates the beam quality of the beam(s) or SS-block identified in the handover command.

The method then proceeds to step 404, where the user device then compares the beam quality of the determined beam(s) to a first threshold value, TH_1. During handover, a target beam(s) may be considered to be blocked when the beam quality (RSRP/RSRQ) is below a network configured value threshold_1 (TH_1) or cannot be detected. This value may be a preconfigured value (e.g., RSRP threshold value) or may be explicitly signalled. This value may be for example a relative value with respect to the previously reported measurement (e.g., if the beam quality corresponding to contention free RACH resource has degraded by N-dB). The value of TH_1 may be signalled in the RRC reconfiguration message with the handover command.

If the beam quality is above TH_1, the method then proceeds with handover at step 406.

However if the beam quality has changed since the first determination of BSI prior to the determination of handover, the beam quality may be below the first threshold value. If the user device determines that the beam quality is below the first threshold TH_1 at step 404, the method then proceeds to step 408, where the user device determines if any other beam(s) from the target cell are above a second threshold value TH_2. When the user device receives dedicated preamble configuration and the beam corresponding to the resource configuration is considered blocked, the user device initiates a contention based RACH procedure to determine one or more alternative/strongest detected beams during the next SS burst set (sweeping period). The at least one alternative strongest detected beam may also have a second threshold TH_2 requirement. TH_2 may be equal to or higher than TH_1. In other embodiments, TH_2 may be lower than TH_1.

Alternatively or additionally, instead of a contention based RACH procedure, the user device may initiate contention free RACH procedure (if configured) to indicate one or more alternative/strongest detected beams during the next SS burst set. The user device may optionally trigger a beam report (to report, e.g., N highest BSI measured). This may be for example in an msg3 or RRC connection request.

Alternatively or additionally, if the sweeping period i.e. SS-block set periodicity (SS block Period/SS-burst set period), is relatively long (e.g., 40 ms/80 ms/120 ms, or the like) the user device may listen only to a partial SS-burst set (one or more but not all of the SS-bursts of the SS-burst sets) in the case one or more beams with an adequate signal level is detected and proceed with the RACH attempt. This level may also be preconfigured. The level may alternatively or additionally depend on the traffic delay requirements.

If there are no beams above the second threshold value TH_2, the method proceeds to 410 where a handover failure procedure is implemented.

If the user device determines that there is at least one other beam from the target small cell above the second threshold value TH_2 at step 408, the method then proceeds to step 412. At step 412, the user device cancels the random access to the beam of the target cell which had user device dedicated resources previously reserved.

The method then proceeds to step 414 where the user device initiates random access to the beam determined to have a quality above the second threshold TH_2.

This determined beam, not having previously allocated resources for the user device, requires a contention based RACH process in order for the user device to establish a connection.

In some embodiments, the first and second threshold values may be interrelated—for example, TH_2 may be derived using TH_1 and an offset parameter.

In other embodiments, TH_1 and TH_2 may not be related.

TH_1 may be a preconfigured value, for example a RSRP threshold value, or may be explicitly signalled by the target cell or source cell. In some embodiments, TH_1 may be signalled in the RRC reconfiguration message. TH_1 may also be a relative value, for example TH_1 may be determined by the beam quality corresponding to the contention free RACH resource degrading by a predetermined amount.

In some embodiments, during handover, the user device may measure alternative beams with beam quality of a first offset offset_1 greater than the beam with dedicated RACH resources. This may be carried out in conjunction with the method of FIG. 4, for example being carried out after step 404 where the beam quality is greater than threshold TH_1 or may be carried out without the other steps of FIG. 4.

If the user device detects such a beam, the user device may initiate a contention based RACH procedure on the resource corresponding to the highest quality beam(s) out of the set of beams measured to have a beam quality at least offset_1 greater than the beam quality of the beam with dedicated RACH resources.

Alternatively, the user device may randomly select a preamble out of the set of beams having beam quality of a first offset offset_1 greater than the beam with dedicated RACH resources, and perform RACH access on the beam corresponding to the selected preamble.

The value of offset_1 may be a preconfigured value or may be dependent on one or more network conditions. The value of offset_1 may be signaled in the RRC reconfiguration message transmitted by the target cell, or by the source cell via RRC signaling or in any other suitable message.

The offset may be evaluated against the strongest beam(s) or SS-block with dedicated RACH resources. In case the evaluation is done on SS-block level UE may measure signals that are transmitted on block level (using a set of beams) such as synchronization signals. In case the evaluation is done on beam level, UE may measure beam specific signals.

In some embodiments, the network may configure the user device with a first timer, Timer_1, during handover. For the duration of the timer in case of a target cell beam or beams with contention free RACH resources considered to degraded/blocked the user device may continue measuring the target cell beams. This may for example be in the context of step 408 of FIG. 4.

The timer may be configured together with a contention-free RACH resource for the source cell. When the timer elapses, and the user device has not received a RAR response from the target cell due to the target cell beam being degraded or blocked, the user device may then initiate RACH access to a dedicated resource on the source cell.

Alternatively the timer may be configured such that the user device does not initiate a contention free RACH access to the target cell if it has been configured with a dedicated preamble resource. If the timer then expires, and the dedicated RACH resources are blocked, the user device may then further initiate contention free RACH.

In some embodiments, the network may configure the user device with a second timer, Timer_2, during handover. This may be in addition or as an alternative to timer 1. During the time period of Timer_2, the contention free random access resource is associated to certain beam/SS-block. Upon expiration of Timer_2, the network ensures that the configured contention free RACH resource is available in all beams or SS-blocks of the target cell. The network can ensure the availability by not configuring other UEs on these resources. It may configure other UEs when the timer_2 is running (for the duration) but when the timer 2 expires, the UE may assume contention free resources are available in every block.

In this embodiment, the network may use the given random access resources for other user devices during the second timer period, while after the expiration of the second timer period, the user device is provided with contention free RACH resources in any of the beams or SS-blocks of the target cell.

The second timer may be lower than the RRC timer (timer 1) which determines the completion or failure of the handover procedure.

In some embodiments, the user device may have reported multiple beams and received multiple dedicated preamble resources corresponding to different reported beams. The user device may also receive resource configuration with contention based allocation for one or more of the reported beams.

The network may prioritize the assigned preamble resources. This prioritization may be done for a group comprising contention free preambles, and separately for a group comprising contention preambles.

The network may prioritize a specific beam within each group implicitly (for example, in the order in which they are signaled) or explicitly (for example, with a priority information being signaled). This informs the user device to access one particular beam if possible, and the order in which to attempt accessing subsequent beams if not possible.

Alternatively or additionally, there may be a delay metric which defined when one or more beams may be used.

In some embodiments, the random access may be initiated for setting up multi/dual connectivity or additional uplink carriers in carrier aggregation, requiring separate timing advance and thus a random access procedure.

In some embodiments, during handover, a user device with multiple connectivity capability may report multiple beams and may receive multiple dedicated preamble resources corresponding to different reported beams. The user device may initiate a RACH procedure to two or more resources with distinctive directions if the user device has such a capability (for example, the user device may have a hybrid receiver with two receiver chains such that it may receive from multiple directions concurrently). Each receiver chain may be associated with a different beam direction.

The network may select which beam to use in transmitting the RAR message.

The user device may select preambles corresponding to the N strongest beams.

The network may be configured to have a beam specific RAR response window for dedicated preamble resources. The user device may be capable of monitoring two or more directions for RAR messages using a time domain monitoring pattern.

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
   receiving, by a user device, handover information, said handover information comprising information relating to one or more first beams, said one or more first beams being target beams of a target cell;
   determining, by said user device, a beam quality or beam qualities associated with said one or more first beams;
   determining, by said user device, a beam quality or beam qualities associated with one or more second beams of the target cell, wherein
      each beam quality comprises a corresponding reference signal received power,
      said one or more second beams are other than said one or more first beams, dedicated uplink resources are associated with said one or more first beams, and shared uplink resources are associated with said one or more second beams; and
   determining, by said user device, that said user device is to initiate a connection to said target cell using a shared uplink resource associated with one of said one or more second beams of said target cell in an instance in which said corresponding reference signal received power or reference signal received powers of said one or more first beams is/are not above a first threshold and said corresponding reference signal received power of said one of said one or more second beams is above a second threshold.

2. The method of claim 1, wherein said second threshold is dependent on said first threshold.

3. The method of claim 2, wherein said second threshold is equal to or higher than said first threshold.

4. The method of claim 1, further comprising:
   communicating, by said user device, with a source cell, in an instance in which said user device is to initiate a connection to said target cell and a respective response message is not received from said target cell in a first time period.

5. The method of claim 1, wherein said dedicated uplink resources are contention free random access resources and said shared uplink resources are contention based random access resources.

6. A user device comprising:
   at least one processor; and
   at least one memory comprising instructions stored therein that, when executed by the at least one processor, cause the user device to perform at least:
      receiving handover information, said handover information comprising information relating to one or more first beams, said one or more first beams being target beams of a target cell;
      determining a beam quality or beam qualities associated with said one or more first beams;
      determining a beam quality or beam qualities associated with one or more second beams of the target cell,
      wherein
         each beam quality comprises a corresponding reference signal received power,
         said one or more second beams are other than said one or more first beams, dedicated uplink resources are associated with said one or more first beams and shared uplink resources are associated with said one or more second beams; and
      determining that said user device is to initiate a connection to said target cell using a shared uplink resource associated with one of said one or more second beams of said target cell in an instance in which said corresponding reference signal received power or reference signal received powers of said one or more first beams is/are not above a first threshold and said corresponding reference signal received power of said one of said one or more second beams is above a second threshold.

7. The user device of claim 6, wherein said second threshold is dependent on said first threshold.

8. The user device of claim 7, wherein said second threshold is equal to or higher than said first threshold.

9. The user device of claim 6, wherein the instructions stored in the at least one memory, when executed by the at least one processor, further cause the user device to perform:
   communicating with a source cell in an instance in which said user device is to initiate a connection to said target cell and a respective response message is not received from said target cell in a first time period.

10. The user device of claim 6, wherein said dedicated uplink resources are contention free random access resources and said shared uplink resources are contention based random access resources.

11. A non-transitory computer-readable storage medium comprising program codes stored therein that, when executed by at least one processor of a user device, cause the user device to perform at least:
   receiving, by the user device, handover information, said handover information comprising information relating to one or more first beams, said one or more first beams being target beams of a target cell;

determining, by said user device, a beam quality or beam qualities associated with said one or more first beams;

determining, by said user device, a beam quality or beam qualities associated with one or more second beams of the target cell, wherein each beam quality comprises a corresponding reference signal received power, said one or more second beams are other than said one or more first beams, dedicated uplink resources are associated with said one or more first beams and shared uplink resources are associated with said one or more second beams; and determining by said user device, that said user device is to initiate a connection to said target cell using a shared uplink resource associated with one of said one or more second beams of said target cell in an instance in which said corresponding reference signal received power or reference signal received powers of said one or more first beams is/are not above a first threshold and said corresponding reference signal received power of said one of said one or more second beams is above a second threshold.

12. The non-transitory computer-readable storage medium of claim 11, wherein said second threshold is dependent on said first threshold.

13. The non-transitory computer-readable storage medium of claim 12, wherein said second threshold is equal to or higher than said first threshold.

14. The non-transitory computer-readable storage medium of claim 11, wherein the program codes stored therein, when executed by the at least one processor of the user device, further cause the user device to perform:

communicating, by said user device, with a source cell, in an instance in which said user device is to initiate a connection to said target cell and a respective response message is not received from said target cell in a first time period.

15. The non-transitory computer-readable storage medium of claim 11, wherein said dedicated uplink resources are contention free random access resources and said shared uplink resources are contention based random access resources.

* * * * *